Patented Mar. 20, 1951

2,545,522

UNITED STATES PATENT OFFICE 2,545,522

OLEFIN-DIHYDRONAPHTHALENE COPOLYMERS

Eugene Lieber, West New Brighton, N. Y., assignor to Standard Oil Development Company, a corporation of Delaware No Drawing. Application April 4, 1945,
Serial No. 586,625

8 Claims. (Cl. 260—88.1)

This invention relates to a novel hydrocarbon copolymerization process and to the products resulting therefrom, and to uses of said products. More particularly, it relates to the preparation of novel, high-molecular weight organic copolymers, and to the use of said copolymers as lubricating oil additives etc.

Broadly, the invention comprises copolymerizing an aliphatic olefin, preferably an isoolefin such as isobutylene, with a dihydronaphthalene or polymerizable methyl, ethyl, chloro or other derivatives thereof to produce polymeric materials, preferably having a linear or chain type structure and having a molecular weight of at least 2,000, preferably about 5,000.

Various aliphatic olefins may be used instead of isobutylene, such as propylene, methyl-2 butene-1 or normal butene, etc. Either the 1:2 dihydronaphthalene or 1:4 dihydronaphthalene may be used.

The reaction is preferably carried out at temperatures below 0° C. such as at —23° C. the boiling point of liquid methyl chloride, or at —78° C. the temperature obtained by the use of solidified carbon dioxide as refrigerant, or even lower temperatures such as —103° C. obtained with the use of liquid ethylene at atmospheric pressure.

Reaction may be carried out in the presence of an inert solvent or diluent if desired, such as some of the saturated petroleum hydrocarbons, e. g., propane, butane, a refined naphtha fraction, various halogenated hydrocarbons such as methyl chloride, ethyl chloride etc.

The copolymerization is preferably carried out in the presence of a catalyst of the Friedel-Craft type such as aluminum chloride, boron fluoride, titanium tetrachloride or various Friedel-Craft complexes known to the art. The amount of catalyst used may vary within a fairly wider range depending partly on the temperature of copolymerization, and upon the activity of the particular catalyst used, but normally it will range from about 0.1 to 2% by weight of the reactant. If desired, the catalyst may be added as a solution in a suitable solvent such as methyl chloride, ethyl chloride, etc., which solution has been preferably made at the boiling point of the solvent or at room temperature, and subsequently cooled down to the desired copolymerization temperature.

The proportion of the two primary reactants to be copolymerized may vary to some extent depending upon the particular olefins used, and depending upon the temperature of copolymerization, but normally will be within the approximate limits of about 0.1% to about 30% by weight, of dihydronaphthalene, the preferred proportions being about 1 to 10% by weight of dihydronaphthalene.

After the copolymerization reaction has been completed, the residual catalyst is hydrolyzed by adding a suitable hydrolyzing agent such as a lower aliphatic alcohol either alone or together with some water or aqueous caustic soda, or other suitable agent.

This hydrolysis may either be carried out before or after permitting the reaction mass to come to room temperature. After the hydrolysis, the copolymer, either still dissolved in the solvent if present during the copolymerization reaction or precipitated out in the form of a plastic mass or hard granules or as a suspension in the hydrolyzing fluid, is separated from the catalyst sludge and hydrolyzing agent by any suitable means such as filtering, coagulating, draining, etc., and finally the copolymer product having a physical form ranging from a viscous liquid to a plastic or resinous solid is freed from any remaining traces of water or volatile solvent by distillation or hot milling. If the copolymer is intended to be used in solution in a mineral lubricating oil or other non-volatile solvent medium, such solvent may be added before evaporation of any volatile solvent, as this will facilitate solution of the polymer in the non-volatile solvent.

The resulting copolymer having a molecular weight of at least 2,000, preferably above 5,000 may have a molecular weight of 20,000, 30,000 or even substantially higher. This copolymer has surprisingly good viscosity index improving properties when added to mineral lubricating oil, as will be apparent from the experimental data given hereinbelow. The copolymer may also be added to other petroleum products such as naphtha or gasoline, kerosene, gas oil, Diesel oil, paraffin wax, petrolatum, or various wax compositions, asphalt, lubricating greases containing various soaps such as sodium, lithium, calcium or aluminum soap, etc. In making any such blends containing waxy oil or paraffin wax, various wax-modifying agents or pour depressors may be used.

The copolymer product of this invention may also be used for various other purposes such as a resinous constituent of adhesives and coating compositions or as a plasticizer or modifier for other resinous products or rubbery materials, such as natural rubber, synthetic rubber of the polybutadiene type or the butadiene-styrene type or of the low-temperature isobutylene-isoprene type or other synthetic, high-molecular weight hydrocarbon materials such as polybutene, styrene-isobutylene copolymers, etc. It may also be sheeted into self-sustaining films.

The novel copolymer of this invention may also be subjected to various chemical reactions to produce chemical derivatives having novel properties particularly advantageous for various purposes; such chemical reactions include halogenation such as chlorination, oxidation, hydrogenation, nitration, sulfonation etc. as well as sulfurization either with elemental sulfur or sulfur chloride or with phosphorus sulfide such as $P_2S_5$, reaction with chlorinated paraffin wax, acyl halides, e. g. stearyl chloride, etc.

The objects, advantages and details of the invention will be better understood from a consideration of the following experimental data.

A series of tests was made in which various concentrations of 1,4 dihydronaphthalene ranging from 1 to 20% by weight in isobutylene (in liquid phase) were copolymerized at either −78° C. or −24° C. by the use of aluminum chloride catalyst in a concentration of about 0.5 or 0.8 gm. per 100 mls. of mixed reactants. In each case, the resultant copolymer was dissolved in a paraffin type mineral lubricating oil base stock having a viscosity of about 45 S. S. U. at 210° F. and a viscosity index of about 100, the amount of copolymer added to the oil ranging from about 1 to 6% by weight, and then the resulting blends were examined for viscosity at 210° F. and for viscosity index. The molecular weight of the copolymer, as determined by the Staudinger method, is also shown in the following table of data:

| Test No. | Per Cent DHN in Feed | Gm./100 Ml. Cat. Conc. | Viscosity, cs. at 210° F. | Per Cent Blend | V. I. | Mol. Wt. (Staud.) |
|---|---|---|---|---|---|---|
| | | | Tests made without diluent, using $CO_2$ internal refrigerant at −78° C. | | | |
| 1 | 1.5 | 0.5 | 26.63 | 3 | 135.3 | |
| 2 | 1.5 | 0.5 | 16.01 | 3 | 137.9 | 17,200 |
| 3 | 1 | 0.5 | 10.29 | 1 | 135.7 | 31,200 |
| 4 | 2 | 0.5 | 8.82 | 1 | 133.1 | 28,700 |
| 5 | 5.0 | 0.5 | 21.55 | 6 | 135.2 | 15,200 |
| 6 | 3 | 0.5 | 10.61 | 3 | 135.7 | 20,200 |
| 7 | 5 | 0.5 | 12.71 | 3 | 135.3 | 13,800 |
| 8 | 10 | 0.5 | 15.22 | 6 | 135.3 | 10,800 |
| 9 | 20 | 0.5 | 8.97 | 6 | 130.5 | 4,200 |
| 10 | 1 | 0.8 | 12.95 | 6 | 132.2 | 6,700 |
| 11 | 3 | 0.8 | 11.38 | 6 | 130.0 | 6,100 |
| 12 | 5 | 0.8 | 10.03 | 6 | 128.2 | 4,900 |

The copolymer obtained in test 4 was studied for viscosity characteristics when blended in a paraffinic lubricating oil base stock in concentrations of 1, 3 and 6% with the following results:

| Per Cent Polymer | 1 | 3 | 6 |
|---|---|---|---|
| Vis/100° F. (cs.) | 55.51 | 123.85 | 319.6 |
| Vis/210° F. (cs.) | 8.82 | 18.97 | 44.1 |
| V. I. | 133.1 | 139.3 | 131.8 |

The above data indicate a number of unexpected results, including first, the mere fact that dihydronaphthalene will copolymerize with a lower aliphatic olefin such as isobutylene at temperatures below 0° C. with a Friedel-Craft catalyst, and secondly, that in a number of instances, it actually produces a copolymer having better viscosity index improving characteristics than polyisobutylene. The reasons for these surprising and unexpected results are not known.

It is not intended that this invention be limited to the specific materials which have been given merely for the sake of illustration, but only by the appended claims in which it is intended to claim all novelty inherent in the invention as well as all modifications coming within the scope and spirit of the invention.

What is claimed is:

1. The process which comprises copolymerizing 70 to 99.9% by weight of an aliphatic monoolefin having from 3 to 5 carbon atoms with 0.1 to 30% by weight of an unsubstituted dihydronaphthalene, in the presence of a Friedel-Crafts catalyst at a temperature of below 0° C. to −103° C.

2. Process which comprises copolymerizing a mixture consisting of 70% to 99.9% by weight of isobutylene and 0.1 to 30% by weight of dihydronaphthalene at a temperature below −20% C. with a Friedel-Craft cataylst.

3. The process which comprises copolymerizing a mixture consisting of 1 to 20% by weight of dihydronaphthalene in 80 to 99% by weight of isobutylene at a temperature below −20° C. with aluminum chloride as catalyst.

4. The process which consists in copolymerizing about 2% by weight of 1,4-dihydronaphthalene with 98% by weight of isobutylene at a temperature of about −78° C., using aluminum chloride as catalyst and using solid carbon dioxide as internal refrigerant.

5. A product consisting of a copolymer of 70 to 99.9% by weight of an aliphatic monoolefin having 3 to 5 carbon atoms and 0.1 to 30% by weight of dihydronaphthalene, said copolymer having a molecular weight of at least 2,000.

6. The product consisting of a copolymer of 70 to 99% by weight of isobutylene and 1.0 to 30% by weight of dihydronaphthalene, said copolymer having a molecular weight of at least 5,000 and being soluble in mineral lubricating oils.

7. A product consisting of a copolymer of about 1 to 5% by weight of dihydronaphthalene and about 95 to 99% by weight of isobutylene, said copolymer having a molecular weight of at least 20,000.

8. A product consisting of a copolymer of about 2% by weight of 1,4-dihydronaphthalene and about 98% by weight of isobutylene, said copolymer having a molecular weight of about 28,700.

EUGENE LIEBER.

REFERENCES CITED

The following references are of record in the file of this patent:

UNITED STATES PATENTS

| Number | Name | Date |
|---|---|---|
| 2,203,044 | Brown | June 4, 1940 |
| 2,264,811 | Rothrock | Dec. 2, 1941 |
| 2,274,749 | Smyers | Mar. 3, 1942 |
| 2,300,069 | Skooglund | Oct. 27, 1942 |